(12) United States Patent
Yonezawa

(10) Patent No.: US 12,066,629 B2
(45) Date of Patent: Aug. 20, 2024

(54) IMAGE DISPLAY APPARATUS AND HEAD-MOUNTED DISPLAY

(71) Applicant: SONY GROUP CORPORATION, Tokyo (JP)

(72) Inventor: Takeshi Yonezawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 556 days.

(21) Appl. No.: 17/419,892

(22) PCT Filed: Jan. 28, 2020

(86) PCT No.: PCT/JP2020/002873
§ 371 (c)(1),
(2) Date: Jun. 30, 2021

(87) PCT Pub. No.: WO2020/162258
PCT Pub. Date: Aug. 13, 2020

(65) Prior Publication Data
US 2022/0082835 A1     Mar. 17, 2022

(30) Foreign Application Priority Data

Feb. 8, 2019   (JP) .................................. 2019-021184

(51) Int. Cl.
  *G02B 27/01*     (2006.01)
  *G02B 27/09*     (2006.01)
(52) U.S. Cl.
  CPC ..... *G02B 27/0172* (2013.01); *G02B 27/0961* (2013.01)

(58) Field of Classification Search
  CPC ............ G02B 27/0172; G02B 27/0961; G02B 2027/0123
  See application file for complete search history.

(56) References Cited

U.S. PATENT DOCUMENTS

| | | | |
|---|---|---|---|
| 2014/0055863 A1* | 2/2014 | Inoguchi | G02B 27/123 |
| | | | 359/630 |
| 2017/0052380 A1 | 2/2017 | Horikawa | |
| 2017/0315360 A1* | 11/2017 | Takeda | G02B 27/0081 |
| 2019/0045176 A1 | 2/2019 | Ratcliff et al. | |

FOREIGN PATENT DOCUMENTS

| | | |
|---|---|---|
| CN | 101743740 A | 6/2010 |
| CN | 103995420 A | 8/2014 |
| CN | 107632506 A | 1/2018 |
| JP | 2014-041281 A | 3/2014 |
| WO | WO 2009/011153 A1 | 1/2009 |
| WO | WO 2013/175549 A1 | 11/2013 |
| WO | WO 2015/170497 A1 | 11/2015 |

\* cited by examiner

*Primary Examiner* — Ryan D Howard
(74) *Attorney, Agent, or Firm* — Paratus Law Group, PLLC

(57) ABSTRACT

There is provided an image display apparatus and a head-mounted display that includes the image display apparatus, the image display apparatus being capable of presenting an image having a large field of view to a user. The image display apparatus includes a lens portion and an enlargement portion. Pieces of light each corresponding to a corresponding one of a plurality of identical images enter the lens portion. The pieces of light passing through the lens portion enter the enlargement portion.

13 Claims, 5 Drawing Sheets

(a)

(b)

IMAGE DISPLAY APPARATUS AND HEAD-MOUNTED DISPLAY

CROSS REFERENCE TO PRIOR APPLICATION

This application is a National Stage Patent Application of PCT International Patent Application No. PCT/JP2020/002873 (filed on Jan. 28, 2020) under 35 U.S.C. § 371, which claims priority to Japanese Patent Application No. 2019-021184 (filed on Feb. 8, 2019), which are all hereby incorporated by reference in their entirety.

TECHNICAL FIELD

The present technology relates to an image display apparatus and a head-mounted display that includes the image display apparatus.

BACKGROUND ART

In recent years, a technology has been proposed that is used to apply an image display apparatus using a lens array to eyewear such as a head-mounted display. For example, Patent Literature 1 discloses an optical system of an image display apparatus, the optical system including a light source, a lens that images light coming from the light source, and a movable mirror that performs raster scanning on the light to form an image. In the optical system, a microlens arrays of a multilens array are arranged at an image-formation position to increase an angle of view of a light ray, and then the image is enlarged. This results in presenting an image having a large field of view to a user who is wearing eyewear. Here, having a large field of view indicates that a range in which a user can recognize an image is wide.

CITATION LIST

Patent Literature

Patent Literature 1: WO2013/175549

DISCLOSURE OF INVENTION

Technical Problem

As described above, there is a need for a technology that enables eyewear such as a head-mounted display to present an image having a large field of view to a user.

In view of the circumstances described above, the present technology is intended to provide, for example, an image display apparatus and a head-mounted display that includes the image display apparatus, the image display apparatus being capable of presenting an image having a large field of view to a user.

Solution to Problem

In order to solve the problems described above, an image display apparatus according to an embodiment of the present technology includes a lens portion and an enlargement portion.

Pieces of light each corresponding to a corresponding one of a plurality of identical images enter the lens portion.

The pieces of light passing through the lens portion enter the enlargement portion.

The lens portion may include a first lens group that includes at least two lenses each corresponding to the corresponding one of the plurality of identical images.

The lens portion may further include
a second lens group that the pieces of light refracted by the first lens group enter, and
a condenser that collects the pieces of light refracted by the second lens group.

The image display apparatus may further include
a light source that emits light, and
a spatial light modulator that modulates the light emitted by the light source.

The spatial light modulator may image, in a first image plane, each piece of light corresponding to the corresponding one of the plurality of identical images, the first image plane corresponding to a corresponding one of the at least two lenses included in the first lens group.

The spatial light modulator may be capable of changing, in a direction of an optical axis of the light source, a position at which each piece of light corresponding to the corresponding one of the plurality of identical images, is imaged.

The lens portion may form combining light obtained by combining the pieces of light each corresponding to the corresponding one of the plurality of identical images.

The lens portion may image the combining light in a second image plane between the lens portion and the enlargement portion.

An outermost ray angle of the combining light in the second image plane may be larger than an outermost ray angle of light in the first image plane.

The first and second lens groups may each have a lens pitch and a focal length that are set such that an air gap is formed in the combining light, and
the condenser and the hologram lens may each have a focal length that is set such that the air gap is formed in the combining light.

The enlargement portion may be a hologram lens that collimates the combining light to obtain parallel light.

The image display apparatus may further include an aperture (a diaphragm) situated between the second lens group and the condenser.

The first and second lens groups may be microlens arrays.

In order to solve the problems described above, a head-mounted display according to an embodiment of the present technology includes an image display apparatus and a display section.

The image display apparatus includes a lens portion and an enlargement portion.

Pieces of light each corresponding to a corresponding one of a plurality of identical images enter the lens portion.

The pieces of light passing through the lens portion enter the enlargement portion.

The display section displays thereon an image enlarged by the enlargement portion.

MODE(S) FOR CARRYING OUT THE INVENTION

Embodiments of the present technology will now be described below with reference to the drawings.

First Embodiment

[Configuration of Image Display Apparatus]

Figure 1:
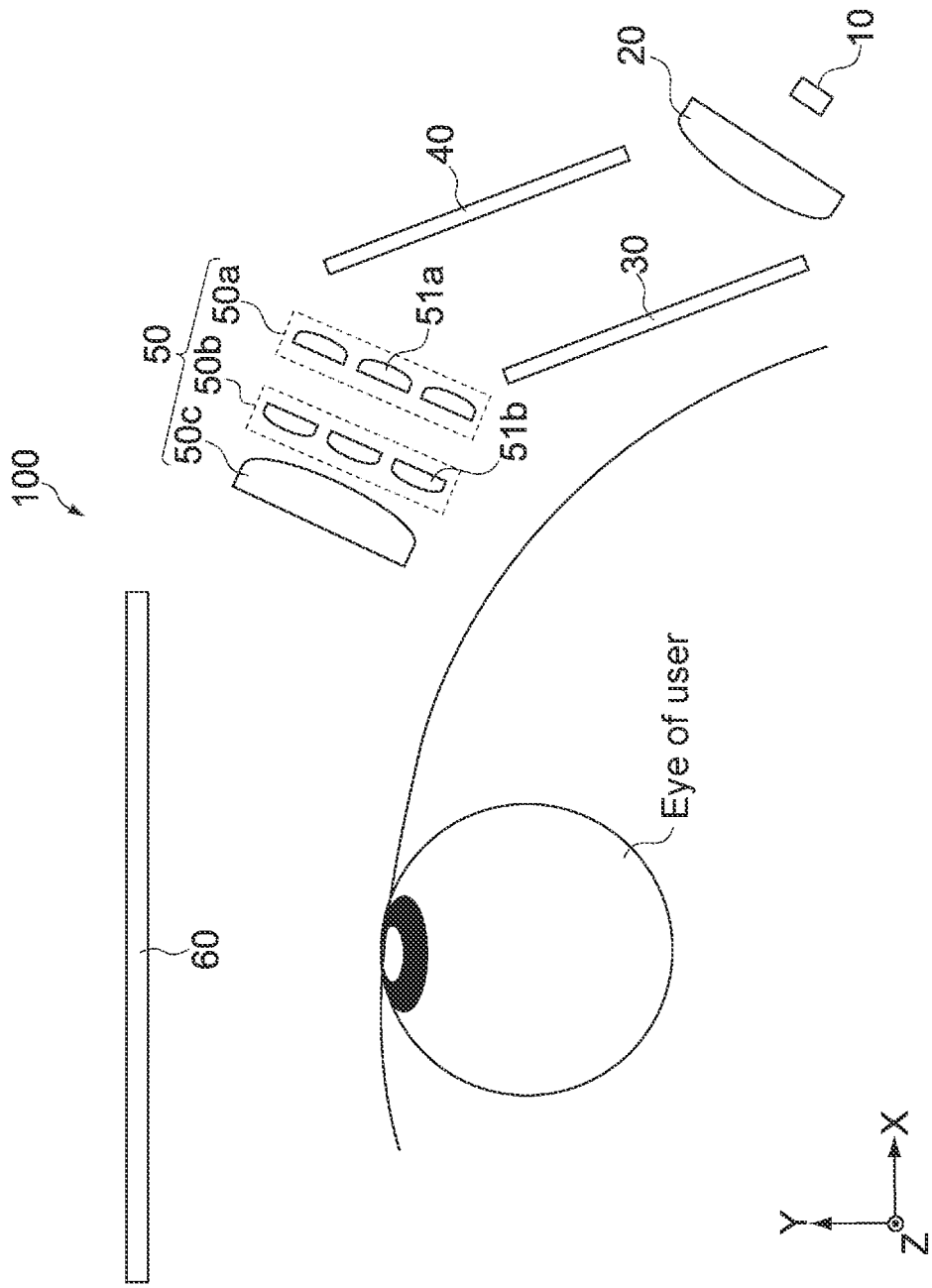
FIG. 1 schematically illustrates an example of a configuration of an optical system of an image display apparatus according to a first embodiment of the present technology.

FIG. 1 schematically illustrates an example of a configuration of an optical system of an image display apparatus according to a first embodiment of the present technology. As illustrated in FIG. 1, an image display apparatus 100 includes a light source 10, a condenser 20, a spatial light modulator (SLM) 30, a reflective mirror 40, a lens-array group 50, and a hologram lens 60. Note that X, Y and Z axes illustrated in FIG. 1 respectively represent directions of three axes, the directions of the three axes being orthogonal to each other. The same applies to subsequent figures.

The light source 10 is typically a coherent light source such as a laser, but is not limited thereto. The light source 10 may be a point light source or a collimated light source. Light exiting the light source 10 is irradiated onto the condenser 20.

The condenser 20 is a lens used to collect light irradiated by the light source 10. Light collected by the condenser 20 is irradiated onto the SLM 30. The condenser 20 may be a single lens or lenses in combination. The condenser 20 is arranged on a light entrance side of the SLM 30 to face the light source 10.

The SLM 30 is a device that displays thereon an interference pattern (a diffraction pattern) that makes up a reproduced image (a hologram image) to be presented to a user, and is capable of modulating light from the light source 10 by electrically controlling a spatial distribution of the light (for example, amplitude, phase, and polarization).

The SLM 30 diffracts incident light irradiated from the condenser 20 so that the diffracted light is reflected off the SLM 30 to be directed to the reflective mirror 40. The SLM 30 of the present embodiment is typically a reflective spatial light modulator, but is not limited thereto. The SLM 30 may be, for example, a transmissive spatial light modulator.

The reflective mirror 40 is a mirror off which diffracted light reflected off the SLM 30 is reflected to be directed to the lens-array group 50. The diffracted light reflected off the reflective mirror 40 passes through the lens-array group 50. The reflective mirror 40 is arranged at a specified distance from the SLM 30 to face the SLM 30. For example, the reflective mirror 40 of the present embodiment includes a function of correcting for a chromatic dispersion of diffracted light diffracted by an interference pattern displayed on the SLM 30, and for a chromatic dispersion of the hologram lens 60.

As illustrated in FIG. 1, the lens-array group 50 includes a first microlens array 50a, a second microlens array 50b, and a convex lens 50c. The lens-array group 50 is an example of a "lens portion" according to an embodiment of the present technology.

The first microlens array 50a includes a plurality of convex lenses 51a arranged at specified intervals in a uniaxial direction. The convex lenses 51a of the present embodiment are favorably two-dimensionally arranged in the uniaxial direction and in a Z-axis direction. The convex lens 51a includes a curved surface that is situated on the side of the light source 10 and has a specified radius of curvature, and a planar surface opposite to the curved surface. The first microlens array 50a is an example of a "first lens group" according to an embodiment of the present technology.

If an interval between (a lens pitch of) the convex lenses 51a is relatively too small with respect to the SLM 30, this will result in a reduction in the resolution of a reproduced image. If the interval between the convex lenses 51a is relatively too large with respect to the SLM 30, this will result in an increase in an air gap between light rays making up the reproduced image, and thus in making the light rays considerably larger in size than the pupil of the eye of a user. Thus, for example, the interval between the convex lenses 51a is favorably not less than 1 mm and not greater than 5 mm, and more favorably not less than 0.8 mm and not greater than 3.4 mm. Here, the lens pitch indicates an interval between adjacent convex lenses 51a.

The convex lens 51a is typically a plano-convex lens, but is not limited thereto. The convex lens 51a may be, for example, a biconvex lens or a convex meniscus lens.

The convex lens 51a may be made of, for example, glass, plastic, quartz, or fluorite, but is not limited to these materials. The number of convex lenses 51a is not particularly limited as long as the number of convex lenses 51a is not less than two. However, if the number of lenses is small, this will result in a small number of light rays making up a reproduced image, and thus in difficulty in securing a large field of view. If the number of lenses is too large, this will result in a reduction in the resolution of a reproduced image. Thus, for example, the number of lenses is favorably not less than two and not greater than ten. In this case, the number of lines of arranged convex lenses 51a in the Z-axis direction orthogonal to a direction in which the convex lenses 51a are arranged is favorably not less than two and not greater than ten.

The convex lens 51a includes a function of refracting diffracted light reflected off the reflective mirror 40 and guiding the light to the second microlens array 50b. The second microlens array 50b is an example of a "second lens group" according to an embodiment of the present technology.

As illustrated in FIG. 1, the second microlens array 50b is situated at a specified distance from the first microlens array 50a in a direction orthogonal to the direction in which the plurality of convex lenses 51a is arranged, such that the second microlens array 50b faces the first microlens array 50a.

The second microlens array 50b includes a plurality of convex lenses 51b arranged at specified intervals in a direction parallel to the arrangement direction of the plurality of convex lenses 51a. The convex lenses 51b of the present embodiment are favorably two-dimensionally arranged in the arrangement direction and in the Z-axis direction. In this case, each of the plurality of convex lenses 51b typically faces a corresponding one of the plurality of convex lenses 51a. The convex lens 51b includes a planar surface on the side of the light source 10, and a curved surface that is opposite to the planar surface and has a specified radius of curvature.

An interval between (a lens pitch of) the convex lenses 51b is typically similar to the interval between the convex lenses 51a, but is not limited thereto. The interval between the convex lenses 51b may be different from the interval between the convex lenses 51a. Further, the convex lens 51b illustrated in FIG. 1 is a plano-convex lens, but is not limited thereto. The convex lens 51b may be, for example, a biconvex lens or a convex meniscus lens.

The convex lens 51b may be made of, for example, glass, plastic, quartz, or fluorite, but is not limited to these materials. The convex lens 51b includes a function of further refracting diffracted light refracted by the convex lens 51a and guiding the light to the convex lens 50c.

The convex lens 50c is a condenser used to collect diffracted light refracted by the convex lens 51b. The convex lens 50c includes a curved surface that is situated on the side of the light source 10 and has a specified radius of curvature, and a planar surface opposite to the curved surface. The convex lens 50c is an example of a "condenser" according to an embodiment of the present technology.

The convex lens 50c is typically a plano-convex lens, but is not limited thereto. The convex lens 51a may be, for example, a biconvex lens or a convex meniscus lens. The convex lens 50c may be made of, for example, glass, plastic, quartz, or fluorite, but is not limited to these materials.

The convex lens 50c further refracts diffracted light refracted by the convex lens 51b to image the diffracted light between the convex lens 50c and the hologram lens 60. The convex lens 50c is arranged on a light exit side of the second microlens array 50b to face all of the plurality of convex lenses 51b. The convex lens 50c is favorably arranged close to the second microlens array 50b in order to not obstruct the view of a user.

Figure 2:
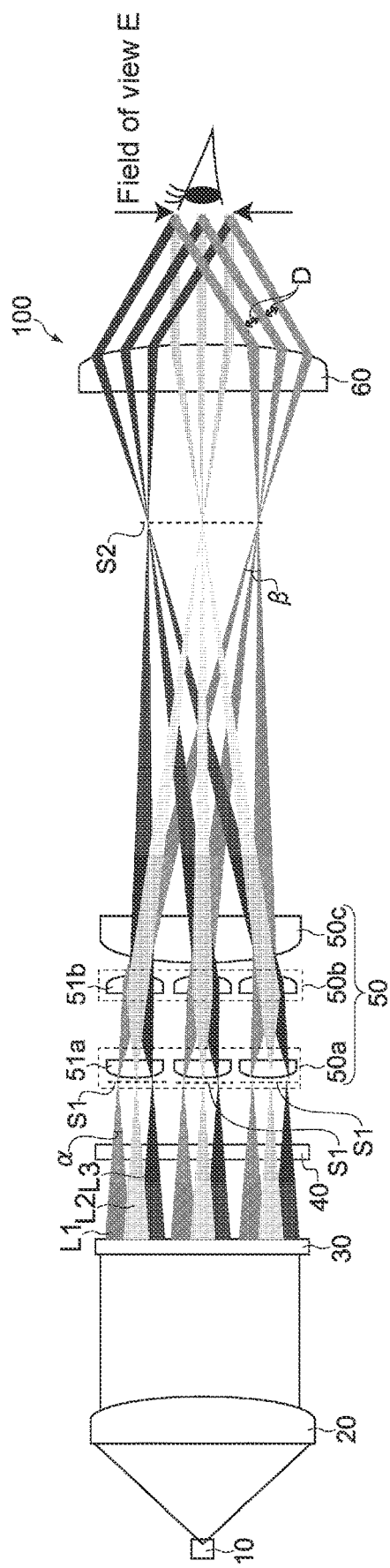
FIG. 2 schematically illustrates the configuration of the optical system of the image display apparatus described above in the plan view.

The hologram lens 60 includes a planar surface on the side of the light source 10, and a curved surface opposite to the planar surface (refer to FIG. 2). Diffracted light refracted by the lens-array group 50 enters the hologram lens 60. The hologram lens 60 may be made of, for example, glass, plastic, quartz, or fluorite, but is not limited to these materials. The hologram lens 60 is an example of an "enlargement portion" according to an embodiment of the present technology.

As illustrated in FIG. 1, the hologram lens 60 is arranged at a specified distance from the eye of a user to face the eye of the user. For example, the distance between the hologram lens 60 and the eye of the user is not less than about 20 mm and not greater than about 50 mm.

The hologram lens 60 is a processed lens for which a focal position and a form of collected light can be freely determined. The hologram lens 60 of the present embodiment collimates diffracted light imaged between the lens-array group 50 and the hologram lens 60 to obtain parallel light, and delivers the parallel light to the eye of the user. Accordingly, the user recognizes a virtual image.

The hologram lens 60 of the present embodiment is typically a reflective hologram lens, but is not limited thereto. The hologram lens 60 may be a transmissive hologram lens. Note that the hologram lens 60 is a decentered lens, which means that a central axis of the hologram lens 60 (an axis passing through a longitudinal center of the hologram lens 60) is inclined with respect to one of or both of reference light and object light that enter the hologram lens 60.

The example of the configuration of the optical system of the image display apparatus 100 has been described above. Each of the structural elements described above may be configured using a general-purpose member, or using a member specialized for a function of the structural element. Such a configuration may be changed as appropriate according to a technical level necessary every time the present technology is practiced.

[Operation of Image Display Apparatus]

FIG. 2 schematically illustrates the configuration of the optical system of the image display apparatus 100 in the plan view, and illustrates a result of tracking light rays in the optical system. An operation of the image display apparatus 100 is described below with reference to FIG. 2 as necessary.

First, light irradiated by the light source 10 is collected by the condenser 20, and the collected light is irradiated onto the SLM 30. The light irradiated onto the SLM 30 is diffracted by interference patterns of which a portion is displayed on the SLM 30, and travels straight toward the reflective mirror 40. The diffracted light diffracted by the SLM 30 is reflected off the reflective mirror 40 to be directed to the lens-array group 50.

Here, in the present embodiment, due to a spatial modulation effect provided by the SLM 30, diffracted light reflected off the reflective mirror 40 is imaged in an image plane S1 (a first image plane) situated near a light-source-side surface of each of the plurality of convex lenses 51a, and a real image corresponding to each convex lens 51a is projected onto the image plane S1, as illustrated in FIG. 2. The SLM 30 of the present embodiment is capable of changing, in a direction of an optical axis of the light source 10, an imaging position, in the space, onto which a real image is projected, that is, a position of the image plane S1 in the space.

Consequently, a position of an image plane S2 (a second image plane) in the space described later can also be changed in the optical-axis direction. This enables representation of the depth of a virtual image projected onto the image plane S2 and enlarged by the hologram lens 60. This results in being able to obtain a three-dimensional image of the virtual image. This makes it possible to solve the so-called "vergence-accommodation conflict" indicating an imbalance in eye function between vergence and accommodation. Note that the above-described spatial modulation effect provided by the SLM 30 indicates that a reproduced image is projected into the space by applying highly coherent light to an interference pattern (a diffraction pattern) displayed on the SLM 30. The SLM 30 is a device that enables representation of a three-dimensional depth of the reproduced image.

Figure 3:
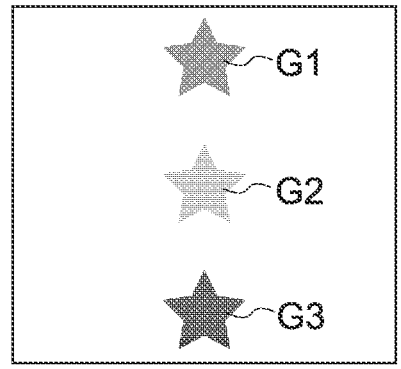
FIG. 3 illustrates an example of a real image projected onto a first image plane and an example of a virtual image projected onto a second image plane.
Figure 3:
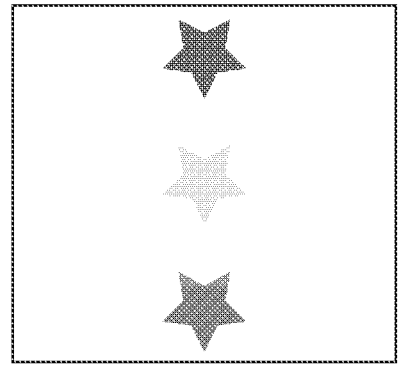

FIG. 3 illustrates an example of a real image projected onto the image plane S1 and an example of a virtual image projected onto the image plane S2. For example, a real image as illustrated in a of FIG. 3 is projected onto the image plane S1. In the present embodiment, a substantially identical real image or an identical real image as illustrated in a of FIG. 3 is projected onto each image plane S1 corresponding to each of the plurality of convex lenses 51a. These real images are an example of a "plurality of identical images" according to an embodiment of the present technology.

Pieces of diffracted light after real images are formed enter the lens-array group 50 to be refracted by the first microlens array 50a, the second microlens array 50b, and the convex lens 50c, and are combined between the convex lens 50c and the hologram lens 60, as illustrated in FIG. 2. This results in forming the image plane S2 having a larger angle of view than the image plane S1, and thus in obtaining a virtual image by a plurality of divided real images being combined to be enlarged.

More specifically, when light that corresponds to a star G1 in the real image illustrated in a of FIG. 3 is diffracted light L1, light corresponding to a star G2 in the real image is diffracted light L2, and light corresponding to a star G3 in the real image is diffracted light L3, the diffracted light L1, the diffracted light L2, and the diffracted light L3 after the real image is formed are refracted by the convex lens 51a to be collected by the convex lens 51b. In this case, the diffracted light L1, the diffracted light L2, and the diffracted light L3 that are refracted by the convex lens 51b have different ray angles for respective images (for example, the stars G1, G2, and G3 in a of FIG. 3), and the diffracted light L1 (the diffracted light L2, the diffracted light L3) passes through each of the plurality of convex lenses 51b to become parallel light. Then, the pieces of parallel light of the plurality of pieces of diffracted light L1 (the plurality of pieces of diffracted light L2, the plurality of pieces of diffracted light L3) enter the convex lens 50c to be imaged in the image plane S2 (at a focal position of the convex lens 50c). In other words, divided real images in the image planes S1 are combined in the image plane S2.

In the present embodiment, a virtual image is projected onto the image plane S2 in the space. This results in preventing a user from recognizing an unnecessary pattern due to lens pattern or an error in manufacturing a lens, compared to a conventional method including projecting an image onto a lens and enlarging the image. Note that, for example, a real image as illustrated in b of FIG. 3 that is an image obtained by inverting a real image as illustrated in a of FIG. 3 is formed again in the image plane S2 when the real image as illustrated in a of FIG. 3 is projected onto the image plane S1.

Here, in the present embodiment, lens pitches of the convex lenses 51a and 51b; and focal lengths of the convex lenses 51a, 51b, and 50c and of the hologram lens 60 are set such that an interval D (an air gap) is produced in combining light (for example, parallel light that corresponds to each star illustrated in b of FIG. 3) obtained by performing imaging in the image plane S2 when the combining light has an angle of view β that is larger than an outermost ray angle α. Accordingly, an interval D (an air gap) is produced between light rays in combining light, and the interval D exhibits an optimal value for securing the field of view of a user.

The interval D is calculated using, for example, Formula (1) indicated below when the field of view of a user is E, the outermost ray angle is α, the number of portions obtained by one-dimensionally dividing the convex lens group 50a is n, and the focal length of the hologram lens 60 is $f_{60}$.

$$E = f_{60} \cdot \tan \alpha + D(n-1) \quad (1)$$

Further, the outermost ray angle α of diffracted light imaged in the image plane S1 (an angle of view of the SLM 30) is calculated using, for example, Formula (2) indicated below when the pixel pitch of the SLM 30 is $P_{30}$ and the light source wavelength of the light source 10 is $\lambda_{10}$.

$$2 \cdot P_{30} \cdot \sin(\alpha/2) = \lambda_{10} \quad (2)$$

Specifically, the lens pitches of the convex lenses 51a and 51b, and the focal lengths of the convex lenses 51a, 51b, and 50c and of the hologram lens 60 are set such that the interval D is, for example, not less than 0.2 mm and not greater than 1.0 mm.

This results in a greater opportunity to capture light rays included in combining light with the eye of a user in its pupil size, that is, an increase in the number of the light rays captured in a range of movement of a rotation of the eye of a user. This provides an effect of making the field of view (a range in which the user can recognize an image) larger. Consequently, when the image display apparatus 100 is applied to eyewear such as a head-mounted display (hereinafter referred to as an "HMD"), an uncomfortable feeling of a user that is caused due to eyewear shifting out of place is reduced. This makes it possible to provide eyewear suitable for a larger number of users.

Diffracted light (combining light) after a virtual image is formed is collimated by the hologram lens 60 to obtain parallel light, and the parallel light is delivered to the eye of a user. Accordingly, an image obtained by enlarging a virtual image projected onto the image plane S2 is formed on the retina of a user without the virtual image becoming smaller. Thus, when the image display apparatus 100 is applied to eyewear such as an HMD, an image (a virtual image) having a larger angle of view than a real image is presented to a user through a display section (not illustrated) of the HMD.

Note that the display section described above is, for example, a display apparatus such as a liquid crystal display (LCD) or an organic electroluminescence (EL) display. In addition to a text and video such as an image, the display apparatus may also output sound such as voice or noise, or vibration.

Second Embodiment

Figure 4:
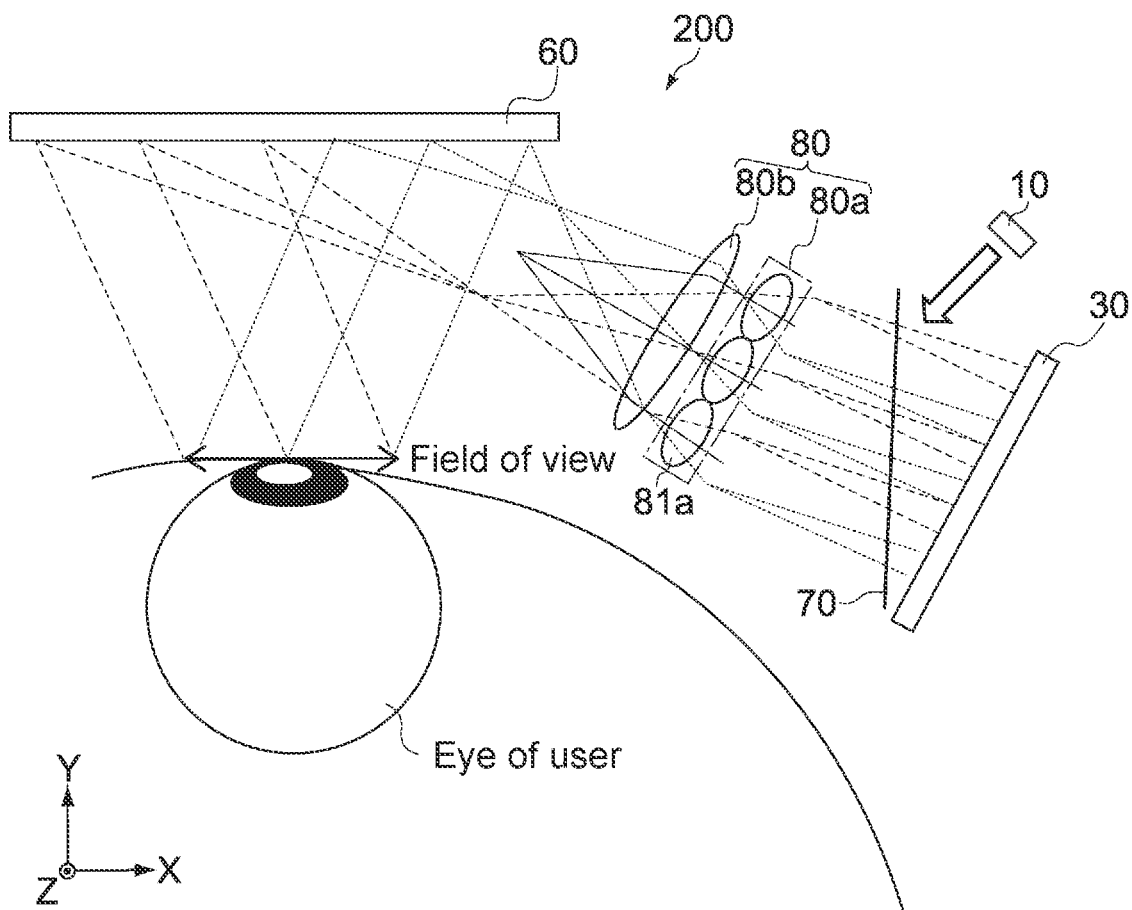
FIG. 4 schematically illustrates an example of a configuration of an optical system of an image display apparatus according to a second embodiment of the present technology.

FIG. 4 schematically illustrates an example of a configuration of an optical system of an image display apparatus 200 according to a second embodiment of the present technology. Hereinafter, a structural element and a function that are similar to those in the first embodiment are denoted by reference symbols similar to those in the first embodiment, and descriptions thereof are omitted.

The second embodiment is different from the first embodiment in that the image display apparatus 200 includes a beam splitter 70 and does not include the reflective mirror 40, and a lens-array group 80 is adopted instead of the lens-array group 50.

The beam splitter 70 is provided between the lens-array group 80 and the SLM 30, and a portion of light irradiated by the light source 10 is reflected off the beam splitter 70 to be directed to the SLM 30. The light from the light source 10 is reflected off the beam splitter 70 approximately orthogonally to the SLM 30. The light is diffracted and modulated by the SLM 30, and the diffracted light is transmitted through the beam splitter 70 to enter the lens-array group 80.

As illustrated in FIG. 4, the lens-array group 80 includes a convex lens group 80a and a convex lens 80b. The convex lens group 80a includes a plurality of convex lenses 81a arranged at specified intervals in a uniaxial direction. It is favorable that the convex lens group 80 be arranged close to an end of the beam splitter 70 from the viewpoint of obtaining a smaller configuration of an apparatus to which the image display apparatus 200 is applied.

The convex lens 81a includes two curved surfaces respectively situated on the side of the beam splitter 70 and on the side of the convex lens 80b, the two curved surfaces each having a specified radius of curvature. The convex lens 81a is typically a biconvex lens, but is not limited thereto. The convex lens 81a may be, for example, a plano-convex lens or a convex meniscus lens.

The number of convex lenses 81a is not particularly limited as long as the number of convex lenses 81a is not less than two. For example, the number of convex lenses 81a is favorably not less than two and not greater than ten. In this case, the number of lines of arranged convex lenses 81a in a Z-axis direction orthogonal to a direction in which the convex lenses 81a are arranged is favorably not less than two and not greater than ten.

The convex lens 81a includes a function of refracting diffracted light diffracted by an interference pattern displayed on the SLM 30 and guiding the light to the convex lens 80b.

As illustrated in FIG. 4, the convex lens 80b is situated at a specified distance from the convex lens group 80a in a direction orthogonal to the direction in which the plurality of convex lenses 81a is arranged, such that the convex lens 80b faces the convex lens group 80a. The convex lens 80b is favorably arranged close to the convex lens group 80a in order to not obstruct the view of a user. Note that, in the second embodiment, an aperture (a diaphragm) may be provided between the convex lens group 80a and the convex lens 80b.

The convex lens 80b is a condenser used to form a reproduced image (a real image) again using the convex lens 81a, the reproduced image (the real image) being projected onto a region situated near the convex lens 81a in substantially the same size as the convex lens 81a. The convex lens 80b includes two curved surfaces respectively situated on the side of the convex lens group 80a and on the side of the hologram lens 60, the two curved surfaces each having a specified radius of curvature.

The convex lens 80b is typically a biconvex lens, but is not limited thereto. The convex lens 80b may be, for example, a plano-convex lens or a convex meniscus lens. The convex lens 80b may be made of, for example, glass, plastic, quartz, or fluorite, but is not limited to these materials.

The convex lens 80b further refracts diffracted light refracted by the convex lens 81a to image the diffracted light between the convex lens 80b and the hologram lens 60.

The image display apparatus 200 of the second embodiment operates similarly to the image display apparatus 100 of the first embodiment. Thus, effects similar to those provided by the first embodiment described above are provided.

Modifications

Although the embodiments of the present technology have been described above, the present technology is not limited to the embodiments described above, and of course various modifications may be made thereto.

For example, the optical system of the image display apparatus 100 of the first embodiment described above is not limited to the configuration illustrated in FIG. 1, and an aperture (a diaphragm) may be provided between the second microlens array 50b and the convex lens 50c. This results in preventing unnecessary light from entering the eye of a user, and thus in preventing artifacts in a reproduced image (a hologram image) reproduced by the SLM 30.

Figure 5:
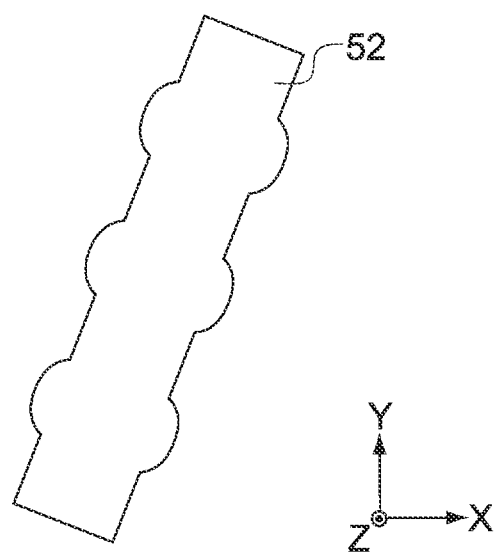
FIG. 5 schematically illustrates an example of a configuration of a lens according to a modification of the present technology.

FIG. 5 schematically illustrates an example of a configuration of a lens according to a modification of the present technology. In the optical system of the image display apparatus 100 of the first embodiment described above, the convex lens 51a and the convex lens 51b are separate from each other, but are not limited thereto, and the convex lens 51a and the convex lens 51b may be integrated. In this case, a lens that includes curved convex portions provided at specified intervals in a longitudinal direction of the lens, as illustrated in FIG. 5, may be included together with, or instead of the convex lens 51a and the convex lens 51b, each curved convex portion protruding in a direction orthogonal to the longitudinal direction.

Further, in the optical system of the image display apparatus 200 of the second embodiment described above, the convex lens 80b is a single lens, but is not limited thereto. A convex lens group may be adopted instead of the convex lens 80b. In this case, the convex lens group may include a tilt component in order to efficiently form a virtual image plane or to reduce an amount of correction performed by the SLM 30. This results in there being no need to correct for an aberration of the optical system when a reproduced image is produced by the SLM 30.

Furthermore, in the optical systems of the image display apparatuses 100 and 200 of the first and second embodiments described above, a real image having a depth may be projected onto the image plane S1. This results in projecting a virtual image having a depth onto the image plane S2. In this case, real images respectively projected onto a plurality of image planes S1 are not completely identical. Adjustment is performed in advance such that the respective real images are superimposed on each other in the image plane S2, and this results in preventing a degradation in image quality.

In addition, the SLM 30 is adopted in the optical systems of the image display apparatuses 100 and 200 of the first and second embodiments described above, but the configuration is not limited thereto. For example, a micromirror may be adopted instead of the SLM 30. Alternatively, for example, a microdisplay may be adopted instead of the light source 10 and the SLM 30.

<Others>

The image display apparatuses 100 and 200 of the present technology are typically applied to eyewear such as an HMD, but the application is not limited thereto. The image display apparatuses 100 and 200 of the present technology may be applied to various apparatuses that are capable of displaying an image.

Further, the effects described herein are not limitative, but are merely descriptive or illustrative. In other words, the present technology may provide other effects apparent to those skilled in the art from the description herein, in addition to, or instead of the effects described above.

The favorable embodiments of the present technology have been described above in detail with reference to the accompanying drawings. However, the present technology is not limited to these examples. It is clear that persons who have common knowledge in the technical field of the present technology could conceive various alternations or modifications within the scope of a technical idea according to an embodiment of the present technology. It is understood that of course such alternations or modifications also fall under the technical scope of the present technology.

Note that the present technology may also take the following configurations.

(1) An image display apparatus, including:
   a lens portion that pieces of light enter, each piece of light corresponding to a corresponding one of a plurality of identical images; and
   an enlargement portion that the pieces of light passing through the lens portion enter.

(2) The image display apparatus according to (1), in which the lens portion includes a first lens group that includes at least two lenses each corresponding to the corresponding one of the plurality of identical images.

(3) The image display apparatus according to (2), in which the lens portion further includes
   a second lens group that the pieces of light refracted by the first lens group enter, and
   a condenser that collects the pieces of light refracted by the second lens group.

(4) The image display apparatus according to (3), further including:

a light source that emits light; and
a spatial light modulator that modulates the light emitted by the light source.

(5) The image display apparatus according to (4), in which
the spatial light modulator images, in a first image plane, each piece of light corresponding to the corresponding one of the plurality of identical images, the first image plane corresponding to a corresponding one of the at least two lenses included in the first lens group.

(6) The image display apparatus according to (4) or (5), in which
the spatial light modulator is capable of changing, in a direction of an optical axis of the light source, a position at which each piece of light corresponding to the corresponding one of the plurality of identical images, is imaged.

(7) The image display apparatus according to (5) or (6), in which
the lens portion forms combining light obtained by combining the pieces of light each corresponding to the corresponding one of the plurality of identical images.

(8) The image display apparatus according to (7), in which
the lens portion images the combining light in a second image plane between the lens portion and the enlargement portion.

(9) The image display apparatus according to (8), in which
an outermost ray angle of the combining light in the second image plane is larger than an outermost ray angle of light in the first image plane.

(10) The image display apparatus according to any one of (7) to (9), in which
the first and second lens groups each have a lens pitch and a focal length that are set such that an air gap is formed in the combining light, and
the condenser and the hologram lens each have a focal length that is set such that the air gap is formed in the combining light.

(11) The image display apparatus according to any one of (7) to (10), in which
the enlargement portion is a hologram lens that collimates the combining light to obtain parallel light.

(12) The image display apparatus according to any one of (3) to (11), further including
an aperture (a diaphragm) situated between the second lens group and the condenser.

(13) The image display apparatus according to any one of (3) to (12), in which
the first and second lens groups are microlens arrays.

(14) A head-mounted display, including:
an image display apparatus that includes
a lens portion that pieces of light enter, each piece of light corresponding to a corresponding one of a plurality of identical images; and
an enlargement portion that the pieces of light passing through the lens portion enter; and
a display section that displays thereon an image enlarged by the enlargement portion.

REFERENCE SIGNS LIST 10 light source
20 condenser
30 spatial light modulator (SLM)
40 reflective mirror
50 lens-array group (lens portion)
50a first microlens array (first lens group)
50b second microlens array (second lens group)
51a, 51b, 50c convex lens (condenser)
60 hologram lens (enlargement portion)
100, 200 image display apparatus

The invention claimed is:
1. An image display apparatus, comprising:
a lens portion that pieces of light enter, each piece of light corresponding to a corresponding one of a plurality of identical images; and
an enlargement portion that the pieces of light passing through the lens portion enter,
wherein the lens portion includes
a first lens group that includes at least two lenses each corresponding to the corresponding one of the plurality of identical images, and
a second lens group that the pieces of light refracted by the first lens group enter.

2. An image display apparatus, comprising:
a lens portion that pieces of light enter, each piece of light corresponding to a corresponding one of a plurality of identical images; and
an enlargement portion that the pieces of light passing through the lens portion enter,
wherein the lens portion includes
a first lens group that includes at least two lenses each corresponding to the corresponding one of the plurality of identical images,
a second lens group that the pieces of light refracted by the first lens group enter, and
a condenser that collects the pieces of light refracted by the second lens group.

3. The image display apparatus according to claim 2, further comprising:
a light source that emits light; and
a spatial light modulator that modulates the light emitted by the light source.

4. The image display apparatus according to claim 3, wherein
the spatial light modulator images, in a first image plane, each piece of light corresponding to the corresponding one of the plurality of identical images, the first image plane corresponding to a corresponding one of the at least two lenses included in the first lens group.

5. The image display apparatus according to claim 3, wherein
the spatial light modulator is capable of changing, in a direction of an optical axis of the light source, a position at which each piece of light corresponding to the corresponding one of the plurality of identical images, is imaged.

6. The image display apparatus according to claim 4, wherein
the lens portion forms combining light obtained by combining the pieces of light each corresponding to the corresponding one of the plurality of identical images.

7. The image display apparatus according to claim 6, wherein
the lens portion images the combining light in a second image plane between the lens portion and the enlargement portion.

8. The image display apparatus according to claim 7, wherein
an outermost ray angle of the combining light in the second image plane is larger than an outermost ray angle of light in the first image plane.

9. The image display apparatus according to claim 6, wherein the first and second lens groups each have a lens pitch and a focal length that are set such that an air gap is formed in the combining light, and the condenser and the enlargement portion each have a focal length that is set such that the air gap is formed in the combining light.

10. The image display apparatus according to claim 6, wherein the enlargement portion is a hologram lens that collimates the combining light to obtain parallel light.

11. The image display apparatus according to claim 2, further comprising an aperture (a diaphragm) situated between the second lens group and the condenser.

12. The image display apparatus according to claim 2, wherein the first and second lens groups are microlens arrays.

13. A head-mounted display, comprising:

an image display apparatus that includes
  a lens portion that pieces of light enter, each piece of light corresponding to a corresponding one of a plurality of identical images; and
  an enlargement portion that the pieces of light passing through the lens portion enter; and
a display section that displays thereon an image enlarged by the enlargement portion,
wherein the lens portion includes
  a first lens group that includes at least two lenses each corresponding to the corresponding one of the plurality of identical images, and
  a second lens group that the pieces of light refracted by the first lens group enter.

* * * * *